(12) United States Patent
Wehling et al.

(10) Patent No.: US 10,416,308 B2
(45) Date of Patent: Sep. 17, 2019

(54) METHOD FOR PRODUCING AN ULTRASONIC SENSOR FOR A MOTOR VEHICLE

(71) Applicant: VALEO Schalter und Sensoren GmbH, Bietigheim-Bissingen (DE)

(72) Inventors: Hans-Wilhelm Wehling, Bietigheim-Bissingen (DE); Wolfgang Hamm, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 499 days.

(21) Appl. No.: 15/107,671

(22) PCT Filed: Dec. 4, 2014

(86) PCT No.: PCT/EP2014/076553
§ 371 (c)(1),
(2) Date: Jun. 23, 2016

(87) PCT Pub. No.: WO2015/096959
PCT Pub. Date: Jul. 2, 2015

(65) Prior Publication Data
US 2016/0329037 A1    Nov. 10, 2016

(30) Foreign Application Priority Data
Dec. 23, 2013   (DE) .................. 10 2013 022 063

(51) Int. Cl.
*G01S 15/00*   (2006.01)
*G01S 15/93*   (2006.01)
(Continued)

(52) U.S. Cl.
CPC ............ *G01S 15/931* (2013.01); *G01S 7/521* (2013.01); *G10K 9/22* (2013.01); *G01S 2015/938* (2013.01)

(58) Field of Classification Search
USPC ........................................................ 367/140
See application file for complete search history.

(56) References Cited

U.S. PATENT DOCUMENTS 3,842,397 A * 10/1974 Sindle .................... G01S 15/87
                                                                    340/904
5,303,205 A *  4/1994 Gauthier ............. B60Q 1/0023
                                                                    367/108
(Continued)

FOREIGN PATENT DOCUMENTS

DE        33 47 442 A1    7/1985
DE       198 32 072 A1    2/1999
(Continued)

OTHER PUBLICATIONS

International Search Report issued in PCT/EP2014/076553 dated May 8, 2015 (2 pages).

(Continued)

*Primary Examiner* — James R Hulka
(74) *Attorney, Agent, or Firm* — Osha Liang LLP

(57) ABSTRACT

The invention relates to a method for producing an ultrasound sensor (20) for a motor vehicle, in which method, for the ultrasound sensor (20), a diaphragm (23) for emitting ultrasound signals in an emitting direction (21) and a sensor housing (24) are provided, in and/or on which sensor housing the diaphragm (23) is fastened, wherein the sensor housing (24) has a front side (25), which points in the emitting direction (21) of the diaphragm (23), and a rear side (26), which points in a rearward direction (27) which is opposite to the emitting direction (21), and wherein the sensor housing (24) is, on the rear side (26), formed with a rear-side installation opening (29) for components of the ultrasound sensor (20), wherein the diaphragm (23) is inserted into the sensor housing (24) through the rear-side installation opening (29) in the emitting direction (21), and (Continued)

said diaphragm is placed, through an interior space (30) of the sensor housing (24), into an installed position at the front side (25) of the sensor housing (24), and is fastened in the installed position.

14 Claims, 3 Drawing Sheets

(51) Int. Cl.
  *G10K 9/22* (2006.01)
  *G01S 7/521* (2006.01)

(56) References Cited

U.S. PATENT DOCUMENTS

| | | | | |
|---|---|---|---|---|
| 5,373,482 | A * | 12/1994 | Gauthier | B60Q 1/0023 367/13 |
| 7,518,491 | B2 * | 4/2009 | Oda | G01S 7/521 180/274 |
| 8,104,351 | B2 * | 1/2012 | Jung | B60R 19/483 73/632 |
| 9,488,727 | B2 * | 11/2016 | Wehling | B60R 19/483 |
| 2003/0089172 | A1 * | 5/2003 | Kupfernagel | G10K 9/122 73/632 |
| 2006/0158066 | A1 * | 7/2006 | Oda | G01S 7/521 310/338 |
| 2007/0001113 | A1 * | 1/2007 | Langlois | G01J 1/02 250/239 |
| 2010/0229649 | A1 * | 9/2010 | Jung | B60R 19/483 73/649 |
| 2014/0039750 | A1 * | 2/2014 | Yopp | G01N 29/32 701/33.1 |
| 2014/0347959 | A1 * | 11/2014 | Hirakawa | G01S 7/521 367/140 |
| 2015/0192673 | A1 * | 7/2015 | Wehling | B60R 19/483 367/138 |

FOREIGN PATENT DOCUMENTS

| | | | | |
|---|---|---|---|---|
| DE | 101 25 272 | A1 | 11/2002 | |
| DE | 102 01 990 | A1 | 7/2003 | |
| DE | 102 21 303 | A1 | 11/2003 | |
| DE | 10 2004 011 486 | A1 | 9/2005 | |
| DE | 10 2007 043 500 | A1 | 3/2009 | |
| DE | 10 2009 022187 | A1 | 11/2010 | |
| DE | 102009022187 | A1 * | 11/2010 | G01S 7/521 |
| DE | 10 2011 105051 | A1 | 12/2012 | |
| DE | 102011105051 | A1 * | 12/2012 | B60R 19/483 |
| DE | 10 2011 120 391 | A1 | 6/2013 | |
| EP | 2 027 580 | B1 | 6/2009 | |
| JP | 2004 015150 | A | 1/2004 | |

OTHER PUBLICATIONS

Written Opinion of the International Searching Authority issued in PCT/EP2014/076553 dated May 8, 2015 (5 pages).
German Search Report issued in Application 10 2013 022 063.7 dated Mar. 30, 2014 (5 pages).

* cited by examiner

METHOD FOR PRODUCING AN ULTRASONIC SENSOR FOR A MOTOR VEHICLE

The invention relates to a method for producing an ultrasound sensor for a motor vehicle, in which method, for the ultrasound sensor, a diaphragm for emitting ultrasound signals in an emitting direction and a sensor housing are provided, in and/or on which sensor housing the diaphragm is fastened, wherein the sensor housing has a front side, which points in the emitting direction of the diaphragm, and a rear side, which points in a rearward direction which is opposite to the emitting direction, and wherein the sensor housing is, on the rear side, formed with a rear-side installation opening for components of the ultrasound sensor. The invention also relates to an ultrasound sensor for a motor vehicle, and to a motor vehicle having an ultrasound sensor of said type.

Ultrasound sensors for motor vehicles are already prior art and may, in a manner known per se, be installed in the front region and in the rear region of a motor vehicle, for example on the bumpers. The ultrasound sensors are assigned to driver assistance devices and provide information regarding the surroundings of the vehicle, more precisely regarding the distances between the vehicle, on the one hand, and the obstructions situated in the surroundings thereof, on the other hand. Driver assistance devices may in this case be, for example, parking assistance systems, systems for blind spot monitoring, systems for maintaining inter-vehicle distance, braking assistance systems and the like.

It is already known for ultrasound sensors of said type to be arranged in unconcealed and thus visible fashion in associated panelling parts, for example in bumpers. This means that they are arranged in cutouts or passage openings extending all the way through the associated panelling part of the vehicle and are visible from the outside. Here, the pot-shaped diaphragm of the ultrasound sensor—the so-called aluminium pot—extends through the passage opening of the panelling part, such that a front side of the diaphragm terminates flush with the outer surface of the panelling part.

Moreover, transducers or ultrasound sensors installed in concealed fashion are also known. These are therefore not visible when the panelling part is viewed from the outside, and are concealed by the panelling part. In the case of ultrasound sensors installed directly behind the panelling part in this way, ultrasound signals are transmitted and received through the material of the panelling part—normally plastic.

The focus of interest in the present case is in particular on ultrasound sensors which are installed in visible and thus in non-concealed fashion, the diaphragms of which are arranged in a cutout extending all the way through the associated panelling part. An ultrasound sensor of said type is normally fastened to the panelling part by way of a bracket composed of plastic, wherein said bracket is attached to the panelling part by way of a double-sided adhesive tape, by hot calking or else by way of ultrasound. The ultrasound sensor can then be inserted into and fastened to the bracket. The use of a bracket of said type for the visible installation of an ultrasound sensor on a bumper is known for example from document DE 10 2007 043 500 A1. Here, the sensor housing including the diaphragm is engaged with detent action into the bracket, which is connected directly to the bumper.

A method for producing an ultrasound sensor is known for example from EP 2 027 580 B1. A first assembly is formed by virtue of a piezo element being fastened to a diaphragm base of a pot-shaped diaphragm. Said first assembly is then inserted into a soft elastic decoupling element in order to form a second assembly. Said second assembly formed in this way is then inserted with detent action into a housing section of a sensor housing of the ultrasound sensor in order to form a third assembly. The decoupling element is inserted into the housing section in an installation direction, which is opposite to the transmitting direction of the ultrasound sensor.

A further method is described in DE 101 25 272 A1. In the case of said production method, the diaphragm of the ultrasound sensor is firstly placed into a two-component injection-moulding installation. In a further working step, a plastics housing is injection-moulded around the diaphragm. After the plastics housing has cured, a rubber-like decoupling element is injection-moulded between the diaphragm and the plastics housing in a further step. In this way, exact and permanent positioning of the diaphragm relative to the sensor housing is ensured.

A known method which serves for the production of an ultrasound sensor and which is similar to the method from document EP 2 027 580 B1 will be discussed in more detail below with reference to FIG. 1: firstly, a pot-shaped diaphragm 1 and a unipartite sensor housing 2 for an ultrasound sensor 3 are provided. The diaphragm 1 is firstly equipped, externally, with a surface protector. The sensor housing 2 is, from its front side 5 pointing in an emitting direction 4 of the diaphragm 1, designed such that it can receive the diaphragm 1 together with a decoupling element 6. For this purpose, the sensor housing 2 has a front-side opening 7 which forms a receptacle for the diaphragm 1 and the decoupling element 6. The diaphragm 1 has an encircling collar 8. At the pre-assembly stage, the diaphragm 1 is firstly pressed into the decoupling element 6. A unit formed by the diaphragm 1 and the decoupling element 6 is then installed in correctly positioned fashion into the sensor housing 2 or into the front-side opening 7 proceeding from the front side 5. Then, an additional decoupling ring 19 with a silicone surface moulded thereon is pushed onto the diaphragm 1 and mechanically fixedly connected to the sensor housing 2 by way of laser welding. On a second assembly line, it is then the case that a piezo element 9 is inserted, in the emitting direction 4, into an interior space 11 of the sensor housing 2 through a rear-side installation opening 10 of the sensor housing 2, and is fastened by way of an adhesive to a rear side 12, facing toward the interior space 11, of a diaphragm base 13. A method of said type, and the selection of a suitable adhesive, is described in the document DE 10 2011 120 391 A1. In a further step, on the second assembly line, contact elements 18, which are intended to lead to the piezo element 9, are bent away, and a wire 17 is welded on, and the plug connectors are pressed into the sensor housing 2 in the emitting direction 4. Here, the wire is inserted into the sensor housing 2 through the rear-side installation opening 10 and is then welded onto the piezo element 9 by way of a laser and solder. Then, the interior space of the pot-shaped diaphragm 1 is filled, from the rear side and thus through the rear-side installation opening 10, with a sealing compound, and the ultrasound sensor is subjected to aging for approximately 24 hours. On a further assembly line, a printed circuit board is then pressed through the rear-side installation opening 10 onto plug connector pins 14. Insulation displacement technology is used for this purpose. The existing cavity or the interior space 11 of the sensor housing 2 is finally filled with an electronics sealing compound through the rear-side installation opening, and cured in a continuous furnace.

Most ultrasound sensors are nowadays produced in accordance with the principle described above. Although said production process has proven to be particularly reliable, a further challenge however consists in further simplifying the production process of the ultrasound sensors in order, in particular, to reduce production costs. In particular, here, firstly the fastening of the diaphragm to the decoupling element and the installation of said unit on the sensor housing, and secondly also the attachment of the further decoupling ring and the welding process to the sensor housing, have proven to be relatively cumbersome. Since, nowadays, ultrasound sensors are used even for vehicles in low price segments, for example in small vehicles, there is a corresponding demand for adaptation of the production processes.

It is an object of the invention to specify a solution with which, in the case of a method of the generic type mentioned in the introduction, the outlay for the production of the ultrasound sensor can be reduced in relation to the prior art, without the characteristics of the ultrasound sensor itself being influenced, and/or to provide a more cost-effective sensor.

Said object is achieved according to the invention by way of a method, by way of an ultrasound sensor and by way of a motor vehicle having the features of the respective independent patent claims. Advantageous embodiments of the invention are specified in the dependent patent claims, in the description and in the figures.

A method according to the invention serves for the production of an ultrasound sensor for a motor vehicle. The ultrasound sensor is designed in particular for visible installation in a cutout extending all the way through a panelling part of the motor vehicle. For the ultrasound sensor, a diaphragm for emitting ultrasound signals in an emitting direction and a sensor housing are provided. The diaphragm is fastened in and/or on the sensor housing. By way of the sensor housing, the ultrasound sensor can then be installed, for example engage with detent action, on a bracket which is connected to the panelling part of the motor vehicle. The sensor housing serves for accommodating components of the ultrasound sensor. The sensor housing has a front side, which points in the emitting direction of the diaphragm, and a rear side, which points in a rearward direction which is opposite to the emitting direction. The sensor housing is furthermore, on the rear side, formed with a rear-side installation opening for components of the ultrasound sensor. It is provided according to the invention that the diaphragm is inserted into the sensor housing through the rear-side installation opening in the emitting direction, and said diaphragm is placed, through an interior space of the sensor housing, into an installed position at the front side of the sensor housing, and is fastened in the installed position.

Thus, instead of the diaphragm being fastened to the sensor bowing proceeding from the front side of the sensor housing, in the direction opposite to the transmitting direction, it is the case according to the invention that a sensor housing having a cavity or an interior space is provided through which the diaphragm can be placed in correctly positioned fashion from the rear side of the sensor housing toward the front side. The diaphragm is thus installed in the emitting direction or in the transmitting direction and, here, is inserted into the interior space through the rear-side installation opening of the sensor housing and then placed into the installed position at the front side of the sensor housing. The production process of the ultrasound sensor can thus be performed with much less outlay in relation to the prior art, because the installation only has to be performed from the rear side of the sensor housing in the emitting direction of the diaphragm. The installation from the front side, and thus in a direction opposite to the emitting direction, is thus rendered superfluous. As a result of the reduction of the production outlay, it is also possible for production costs to be saved.

To permit the installation of the diaphragm through the rear-side installation opening, provision may be made for the contact elements that are normally provided in the housing (in particular the contact pins 14 as per FIG. 1) to be relocated outward in a radial direction, and thus perpendicular to the emitting direction, to such an extent that an interior space is created through which the diaphragm can, in the correct orientation and thus with the diaphragm base forward, be placed without obstruction into the installed position at the front side of the sensor housing.

It is now possible for two alternative embodiments to be provided: firstly, on its front side, the sensor housing may be formed with a front-side wall which delimits the interior space, such that the sensor housing is of closed form at the front side. Secondly, it may however be provided that, on the front side, the sensor housing is formed with a front-side opening for the diaphragm.

If, on the front side, the sensor housing is formed with a front-side wall which delimits the interior space, it is thus possible, during the placing of the diaphragm into the installed position, for a front side, which points in the emitting direction and by way of which the ultrasound signals are emitted, of the diaphragm, that is to say the diaphragm base, to be connected to an inner side, which faces toward the interior space of the sensor housing, of the front-side wall. In this way, in the installed position, the diaphragm is situated entirely in the interior space of the sensor housing and can emit and receive the ultrasound signals through the front-side wall of the sensor housing. In other words, in this embodiment, the diaphragm is arranged in concealed fashion in the interior space of the sensor housing and can transmit through said wall region. This embodiment has the advantage in particular that additional measures with regard to the sealing of the sensor housing at the interface between diaphragm and sensor housing, with the associated disadvantages with regard to installation outlay and costs, are rendered superfluous. Also, no problems arise with regard to ice formation during the operation of the ultrasound sensor. Furthermore, the diaphragm no longer needs to be coated with a surface protector, whereby the outlay in terms of production is further reduced. Furthermore, there are basically no resulting tolerance problems during installation of the diaphragm. The intermediate space between the diaphragm, on the one hand, and the housing, on the other hand, can furthermore be filled with a silicone sealing compound and/or a foamed material, in particular a single-component foamed material, without great outlay, in order to ensure vibration decoupling between the diaphragm and the sensor housing. The decoupling ring which, in the prior art, is inserted into the cutout extending all the way through the panelling part of the vehicle can also be omitted, which firstly reduces the number of components required, and furthermore also improves the visual appearance of the panelling part with the ultrasound sensor. The front-side wall of the sensor housing may specifically terminate flush with a front surface of the panelling part, such that, altogether, a closed appearance of said arrangement is realized. A further advantage of said embodiment is that it is possible to dispense with a collar of the diaphragm which serves for the fastening of the diaphragm. The diaphragm can thus be formed without a collar. Furthermore, it is thus possible for the inner diameter of the sensor housing to be kept small, in order that the diaphragm can be installed from one side. In this way, the outer diameter of the sensor housing is also kept small, or does not become larger.

The front side of the diaphragm may preferably be connected to the inner side of the front-side wall by way of an adhesive pad. Thus, the front side of the diaphragm bears against the inner side of the front-side wall via the adhesive pad. Here, it is for example possible to use a double-sided adhesive pad with a thickness of 0.05 mm. Here, the diaphragm is preferably inserted, in correctly positioned fashion, together with the adhesive pad into the sensor housing and pressed against the inner side of the front-side wall. The diaphragm is thereby fixedly connected to the front-side wall. The use of the adhesive pad has the advantage in particular that no dosing of a liquid adhesive, and thus no curing by heat either, is required, whereby the required production time is reduced.

It has proven to be advantageous if the front-side wall of the sensor housing is formed with a thickness of less than 0.5 mm, for example with a thickness of 0.3 mm. Thus, the influence of the front-side wall on the vibration characteristics of the diaphragm is very small, and the front-side wall does not influence the propagation of the ultrasound waves.

The front-side wall, and in particular the sensor housing as a whole, is preferably produced from plastic. Here, the sensor housing is preferably formed in one piece, such that the front-side wall is in one piece with the rest of the sensor housing.

As already stated, in an alternative embodiment, on the front side, the sensor housing may be formed with a front-side opening for the diaphragm. Here, during the placing of the diaphragm into the installed position, the diaphragm may be passed in regions through the front-side opening proceeding from the interior space of the sensor housing, and in the installed position, said diaphragm is brought into contact with an abutment element. Thus, in the installed position of the diaphragm, the front side of the diaphragm and thus a front-side region of the diaphragm projects out of the sensor housing through the front-side opening. This embodiment has the advantage that the ultrasound signals can be emitted and received through the diaphragm without obstruction, and nevertheless the production outlay is reduced, because the installation of the diaphragm is performed from the rear side of the sensor housing.

The pot-shaped diaphragm may be formed with a collar which projects radially outward and thus in a direction perpendicular to the emitting direction. During the placing of the diaphragm into the installed position through the front-side opening, the collar of the diaphragm may then be brought into contact with the abutment element, which is in particular of soft elastic form. By way of a collar of said type, precise positioning of the diaphragm in the installed position, and furthermore also reliable fastening in an axial direction, can be made possible.

It is preferable for the diaphragm, in particular the collar, to be brought into contact with a vibration decoupling element, which is formed from a soft elastic material, as abutment element, said element being attached to a flange element, which delimits the front-side opening, of the sensor housing. By way of a vibration decoupling element of said type, the diaphragm can be decoupled in terms of vibration from the sensor housing. Furthermore, the vibration decoupling element also functions as a seal, by way of which the sensor housing is sealed off. The vibration decoupling element may for example be composed of silicone.

In all embodiments, it may be provided that a fastening element is inserted through the rear-side installation opening into the interior space of the sensor housing, by way of which fastening element the diaphragm is held in the installed position so as to be secured in position along the emitting direction and thus in an axial direction. A fastening element of said type may for example be composed of plastic. It may be pressed into the interior space of the sensor housing. For this purpose, it is for example possible for elongate guide elements to be provided in the sensor housing, which guide elements are utilized for the linear insertion and pressing of the fastening element into the interior space. Said guide elements may be injection-moulded on an inner side of the sensor housing. By way of a fastening element of said type, the diaphragm can be fastened in particularly secure and slip-resistant fashion in the installed position and held reliably in the axial direction. The fastening element proves to be advantageous in particular in the embodiment in which, on the front side, the sensor housing is formed with the front-side opening mentioned above, through which the diaphragm is passed.

It is also possible for a damping element formed from a soft elastic material—for example from silicone—to be arranged between the diaphragm and the fastening element. Said damping element may for example be formed in the shape of a disc. It may either be inserted as a separate element between the diaphragm and the fastening element, or may be attached, in particular injection-moulded onto, a front side of the fastening element.

In all embodiments, it may also be provided that, after the placing of the diaphragm into the installed position, an intermediate space between the diaphragm and the sensor housing and/or an interior space of the diaphragm is filled with a sealing compound, in particular with a single-component sealing compound. Use may for example be made of a silicone sealing compound, in particular a single-component silicone sealing compound, and/or an installation foam, in particular a single-component foam, for example PU foam, in particular with porous cavities. The filling of the intermediate space between the diaphragm and the sensor housing proves to be advantageous in particular in the embodiment in which, on the front side, the sensor housing is formed with the abovementioned front-side wall which axially delimits the interior space of the sensor housing. In specifically that case, the decoupling ring between the ultrasound sensor and the panelling part of the vehicle should be dispensed with. Here, the additional sealing compound ensures reliable decoupling of the diaphragm from the sensor housing and thus decoupling between diaphragm and panelling part. The advantage of a single-component silicone sealing compound consists in the easy application, and also in the fact that the sealing compound does not foam, but in particular forms porous cavities.

The invention also relates to an ultrasound sensor for a motor vehicle, having a diaphragm for emitting ultrasound signals in an emitting direction, and having a sensor housing, in and/or on which the diaphragm is fastened, wherein the sensor housing has a front side, which points in the emitting direction of the diaphragm, and a rear side, which points in a rearward direction which is opposite to the emitting direction, and wherein, on the rear side, the sensor housing has a rear-side installation opening, and the diaphragm is inserted into the sensor housing through the rear-side installation opening in the emitting direction, and is fastened, in an installed position, to the front side of the sensor housing.

A motor vehicle according to the invention comprises an ultrasound sensor according to the invention.

The preferred embodiments presented with regard to the method according to the invention, and the advantages thereof, apply correspondingly to the ultrasound sensor according to the invention, and to the motor vehicle according to the invention.

Further features of the invention will emerge from the claims, from the figures and from the description of the figures. All of the features and feature combinations mentioned above in the description, and the features and feature combinations mentioned below in the description of the figures and/or shown in the figures alone, may be used not only in the respectively specified combination but also in other combinations or individually.

The invention will now be discussed in more detail on the basis of some preferred exemplary embodiments and with reference to the appended drawings, in which.

Figure 2:
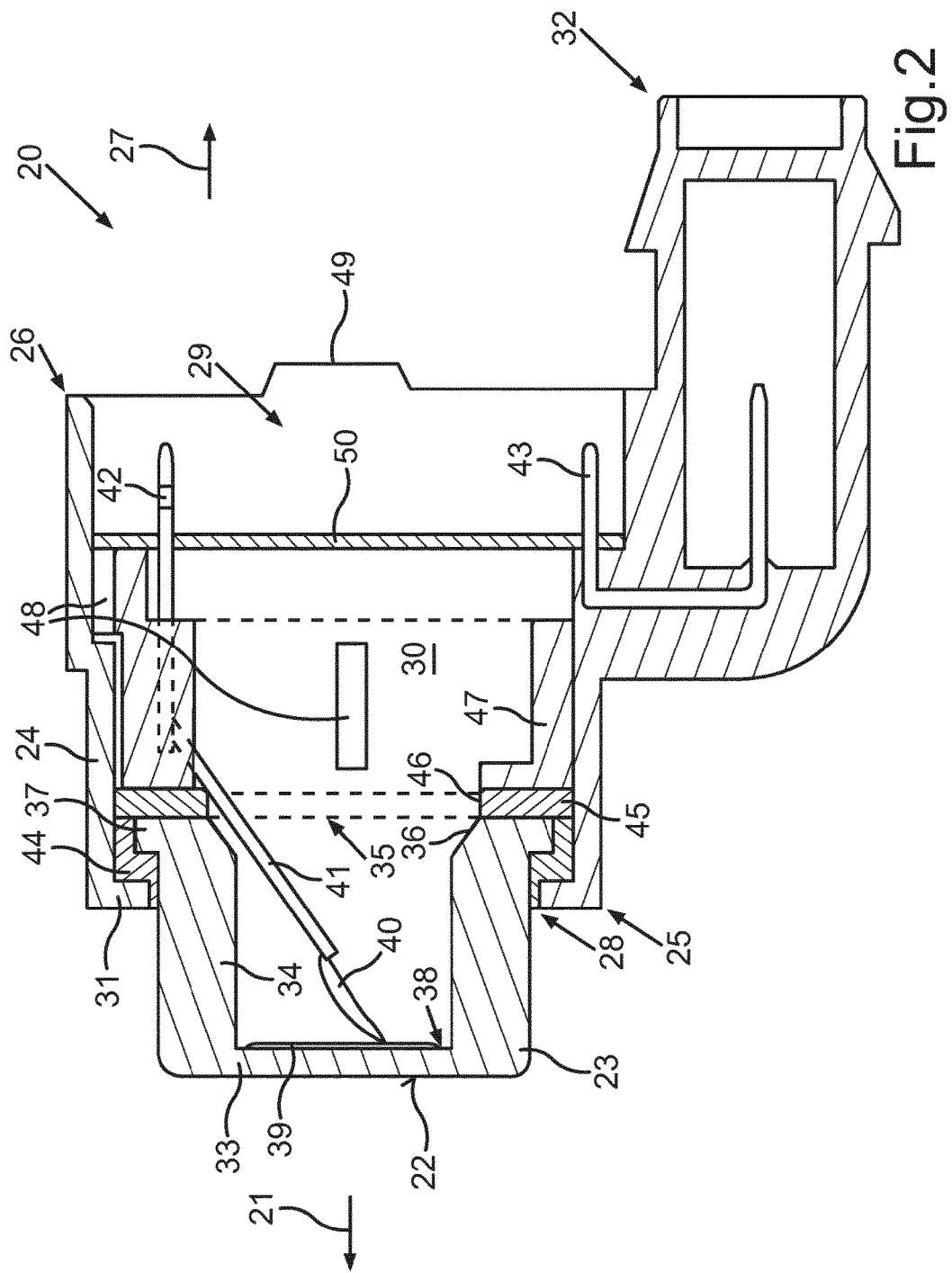
FIG. 2 shows, in a schematic illustration, a sectional view through an ultrasound sensor according to a first embodiment of the invention.
Figure 3:
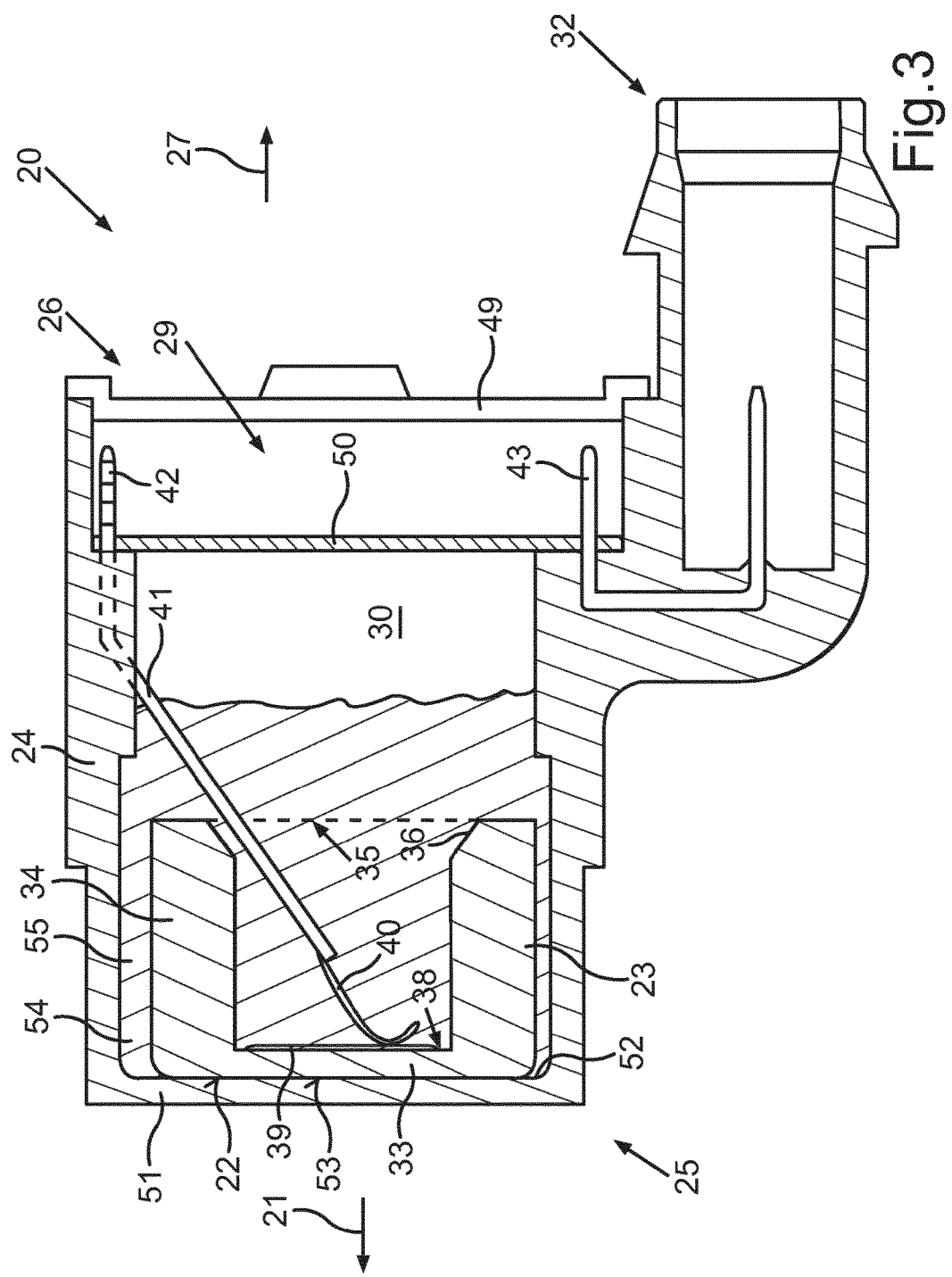
FIG. 3 shows, in a schematic illustration, a sectional view through an ultrasound sensor according to a second embodiment of the invention.

In FIGS. 2 and 3, identical or functionally identical elements are denoted by the same reference designations.

FIG. 2 shows an ultrasound sensor 20 according to a first embodiment. The ultrasound sensor 20 is provided for installation on a panelling part of a motor vehicle, for example on a bumper. Here, the ultrasound sensor 20 is provided in particular for the visible, and thus non-concealed, installation on the panelling part, such that, after installation on the panelling part, a front side 22, pointing in the emitting direction 21, of a diaphragm 23 is visible from outside the motor vehicle, and for example terminates flush with the outer surface of the panelling part. It should however be understood that the ultrasound sensor may alternatively also be installed in concealed fashion. The ultrasound sensor is then not visible, and is concealed by the panelling part, when the panelling part is viewed from the outside. In that case, the ultrasound sensor would be installed directly behind the panelling part, and ultrasound signals would be transmitted and received through the material of the panelling part—normally plastic.

The ultrasound sensor 20 furthermore comprises a sensor housing 24 in which the components of the ultrasound sensor 20 are accommodated in protected fashion. By way of the sensor housing 24, the ultrasound sensor 20 can be fastened to the panelling part. Here, the sensor housing 24 is for example connected to a bracket and fastened by way of the bracket to the panelling part. For example, the sensor housing 24 is engaged with detent action into the bracket. The sensor housing 24 is formed in one piece, for example from plastic.

The sensor housing 24 has a front side 25, which points in the emitting direction 21 or transmitting direction of the diaphragm 23, and also a rear side 26, which points in an opposite direction 27. On the front side 25, there is formed in the sensor housing a front-side opening 28 which is a passage opening. Correspondingly, a rear-side installation opening 29 is also formed on the rear side 26. In the non-installed state, an interior space 30 of the sensor housing 24 is thus delimited only in a radial direction, and thus perpendicular to the emitting direction 21, by the plastics material. At the front side 25, the sensor housing 24 furthermore has an encircling flange element 31 which points radially inward and which radially delimits the front-side opening 28.

The sensor housing 24 furthermore has a plug connector 32 by way of which the ultrasound sensor 20 can be electrically coupled to a control unit of the motor vehicle.

The diaphragm 23 is of altogether pot-shaped form and is composed for example of aluminium. Said diaphragm has a diaphragm base 33, which has the front side 22, and a cylindrical encircling shell 34. At a rear side 35 situated opposite the front side 22, the diaphragm 23 is open and has an opening 36. Furthermore, a radially outwardly pointing collar 37 is formed on the shell 34 at the rear side 35.

On a rear side 38, which faces toward the interior space 30, of the diaphragm base 33, there is arranged a piezo element 39 which is designed to excite the diaphragm 23. The piezo element 39 is supplied with electrical energy via a wire 40 and an electrical contact element 41 and a contact pin 42.

Figure 1:
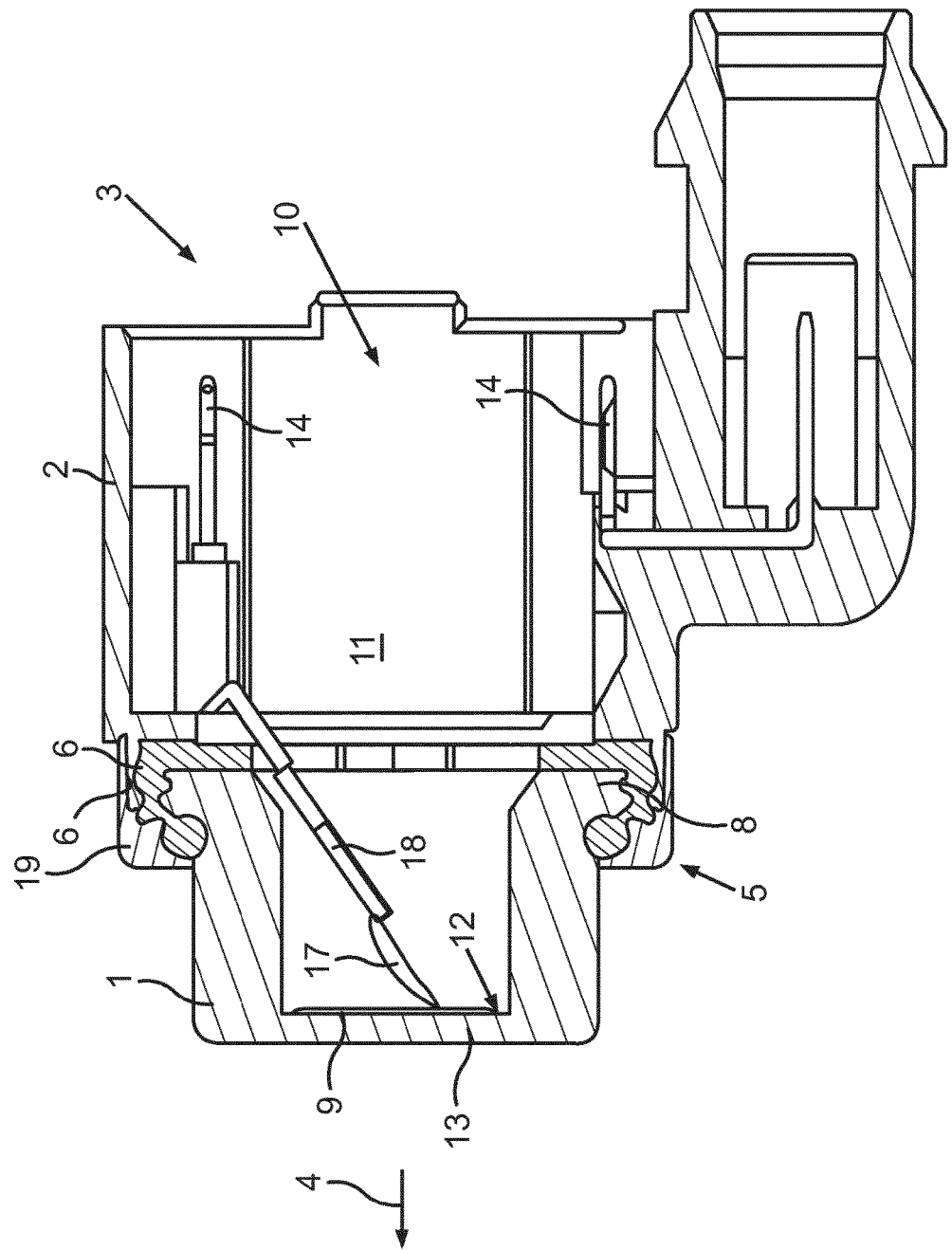
FIG. 1 shows, in a schematic illustration, a sectional view through an ultrasound sensor according to the prior art.

A method for the production and for the assembly of the ultrasound sensor 20 as per FIG. 2 will be discussed in more detail below:

Firstly, the diaphragm 23 and the sensor housing 24 are provided. Before installation, the diaphragm 23 is coated, externally and thus on the outer side, with a surface protector. The sensor housing 24 is produced such that its interior space 30 has, overall, a larger dimension in a radial direction than the outer diameter of the collar 37 of the diaphragm 23, and the diaphragm can thus be placed, through the rear-side installation opening 29, into the interior space 30 and into the installed position, shown in FIG. 2, at the front side 25. For this purpose, the plug connector 32 with a further contact pin 43 is located radially further outward in relation to the prior art as per FIG. 1.

In a further step, from the inner side of the sensor housing 24, a vibration decoupling element 44 is fastened to the flange element 31, which vibration decoupling element simultaneously constitutes an encircling seal. Said vibration decoupling element 44 may be formed from a soft elastic material, for example from silicone, in particular from so-called LSR (liquid silicone rubber). Said vibration decoupling element 44 may for example be injection-moulded onto the flange element 31.

In a further step, the diaphragm 23 is installed in the emitting direction 21, in correctly positioned fashion, through the rear-side installation opening 29 and through the interior space 30 of the sensor housing 24 into the installed position shown in FIG. 2. Here, the collar 37 is brought axially into contact with the vibration decoupling element 44, such that contact between the diaphragm 23 and the sensor housing 24 is prevented. The vibration decoupling element 44 in this case functions as an abutment element, as far as which the diaphragm 23 can be moved in the emitting direction 21.

The diaphragm 23 is then clamped by way of a damping element 45 which is in the form of a disc and which has a central passage opening 46 which overlaps the opening 36 of the diaphragm 23. The damping element 45 is provided so as to be formed from a soft elastic material, for example from silicone, in particular from LSR, as stated above. The damping element 45 may optionally also be injection-moulded onto a fastening element 47 by way of which the diaphragm 23 is held in securely positioned fashion in the installed position.

Thus, in a further step, the fastening element 47 composed of plastic, which may for example be in the form of a ring, is inserted and pressed into the interior space 30 in the emitting direction 21 through the rear-side installation opening 29. For this purpose, guide elements 48 in the form of ribs are provided on the sensor housing 24, which guide elements are of elongate form and extend along the emitting direction 21. The contact pin 42 and the contact element 41 may also be integrated into said fastening element 47, which holds the diaphragm 23 in securely positioned fashion in the axial direction and thus along the emitting direction 21.

The fastening element 47 therefore now also serves as a carrier for the contact pin 42 and the contact element 41.

In a further step, the piezo element 39 is inserted into the interior space 30 from the rear side 26 through the rear-side installation opening 29, and is positioned on, pressed against and adhesively bonded to the rear side 38 of the diaphragm base 33. Here, use may for example be made of a liquid adhesive, optionally also an adhesive which cures at cold temperatures and which preferably cures in the absence of air, as described in DE 10 2011 120 391 A1. Alternatively, use may also be made of an adhesive pad.

It is then possible for the contact element 41 to be bent from the fastening element 47, and the wire 40 is welded on and connected to the piezo element 39.

A sealing compound, for example a single-component foam (installation foam) and/or a single-component silicone sealing compound, may then be introduced into the interior space 30, including the interior space of the diaphragm 23.

A printed circuit board 50 is then mounted onto the contact pins 42, 43. Subsequently, the space between the printed circuit board 50 and the installation opening 29 may likewise be filled with a sealing compound, for example a single-component foam and/or a single-component silicone sealing compound. In addition or alternatively to the sealing compound, use may also be made of a plastics cover 49, in particular in the form of a plastics foil, to cover the rear-side installation opening 29. Said plastics cover 49 may for example be welded to the sensor housing 24 by way of ultrasound.

An ultrasound sensor 20 according to a second embodiment is illustrated in FIG. 3. By contrast to the embodiment as per FIG. 2, the sensor housing 24 is now of closed form at the front side 25 and has a front-side wall 51 which extends perpendicular to the emitting direction 21 and which delimits the interior space 30 axially. Here, the front-side wall 51 has a thickness of 0.3 mm.

The diaphragm 23 is now formed without a collar, such that the collar 37 as per FIG. 2 is dispensed with. The front side 22 of the diaphragm 23 is connected by way of an adhesive pad 53 to an inner side 52, facing toward the interior space 30, of the front-side wall 51. Therefore, no action of heat is required for the production of the adhesive connection between the front side 22 and the wall 51. The contact pin 42 is integrated into the sensor housing 24.

A method for the assembly or for the production of the ultrasound sensor 20 as per FIG. 3 will be described in more detail below:

Because the diaphragm 23 is now situated entirely within the sensor housing 24 and emits the ultrasound signals through the front-side wall 51 which is formed in one piece with the sensor housing 24, it is now possible to dispense with an additional diaphragm coating or with the above-mentioned surface protector. The diaphragm 23 is thus inserted, without a surface coating, into the interior space 30 through the rear-side installation opening 29 of the sensor housing 24, and is placed, through said interior space, into the installed position as per FIG. 3, and is adhesively bonded there to the inner side 52 of the wall 51 by way of the adhesive pad 53. The adhesive pad 53 has a thickness of 0.05 mm. The housing 24 or the front-side wall 51 may be covered, on the outside, with a coat of colour paint, in particular of the same colour as the vehicle and/or of a colour according to customer preference. Thus, an ultrasound sensor of the desired colour can be provided or assembled already during the manufacturing or assembly process, and retroactive painting can be dispensed with. Alternatively, retroactive painting is also possible, for example after the manufacturing or assembly process and/or the inspection of the ultrasound sensor. It is thus possible to realize a high-quality overall appearance of the panelling part of the motor vehicle. It is thus possible to ensure a uniform, uninterrupted colour design by way of the coat of colour paint.

In a further step, the installation of the piezo element 39 is performed. This may be performed in the manner already described above, that is to say analogously to the embodiment as per FIG. 2. It has proven to be advantageous for the piezo element 39 to be adhesively bonded to the rear side 38 of the diaphragm base 33 by way of an adhesive pad, because here, no curing and no action of heat are required.

The production of the electrical connection between the contact element 41 and the piezo element 39 is likewise realized in the manner already described above, wherein the electrical contact element 41 is bent away from the housing 24.

In a further step, an intermediate space 54 between the diaphragm 23 and the sensor housing 24, and optionally also the interior space of the diaphragm 23, and optionally also an adjoining region of the interior space 30 of the sensor housing 24, are filled with a sealing compound 55. Here, use is preferably made of a single-component sealing compound, in particular a single-component foam and/or a single-component silicone sealing compound.

In a further assembly step, the printed circuit board 50 is mounted or pushed onto the contact pins 42, 43.

To protect the printed circuit board 50 against moisture, the following solutions are proposed: the space between the printed circuit board 50 and the rear-side installation opening 29 may likewise be filled with a sealing compound, for example with a PU covering sealing compound. Alternatively, said intermediate space may be filled with a single-component foam. As a further alternative, it is also possible for the cover 49, in particular in the form of a foil, to be inserted and welded to the housing 24 in order to cover the rear-side installation opening 29. It is optionally possible for an inner side of the cover 49 or of the foil to be provided with a metal layer, composed in particular of copper, which then acts as an additional EMC shield.

The invention claimed is:

1. A method for producing an ultrasound sensor by performing installation steps from a single side of the ultrasound sensor, the method comprising:
for the ultrasound sensor providing a diaphragm for emitting ultrasound signals in an emitting direction;
providing a sensor housing, in and/or on which the diaphragm is fastened,
wherein by way of the sensor housing, the ultrasound sensor is configured to be installed on a holder which is connected to a panelling part of a motor vehicle,
wherein the sensor housing has a front side, which points in the emitting direction of the diaphragm, and a rear side, which points in a rearward direction which is opposite to the emitting direction, and
wherein the sensor housing is, on the rear side, formed with an electrical contact element and a rear-side installation opening for components of the ultrasound sensor;

inserting the diaphragm into the sensor housing through the rear-side installation opening in the emitting direction;

placing said diaphragm, through an interior space of the sensor housing, into an installed position at the front side of the sensor housing;

fastening the diaphragm in the installed position, and placing, subsequent to at least said inserting the diaphragm into the sensor housing through the rear-side installation opening, an electrical contact element into the sensor housing for transmitting the ultrasound signals to the electrical contact element of the sensor housing, wherein placing the electrical contact element into the sensor housing subsequent to inserting the diaphragm into the sensor housing through the rear-side installation opening eliminates performing any installation step from the front side of the sensor housing.

2. The method according to claim 1,
wherein on the front side, the sensor housing is formed with a front-side wall which delimits the interior space, and, during the placing of the diaphragm into the installed position, a front side, which points in the emitting direction and by way of which the ultrasound signals are emitted, of the diaphragm is connected to an inner side, which faces toward the interior space of the sensor housing, of the front-side wall.

3. The method according to claim 2, wherein the front side of the diaphragm is connected to the inner side of the front-side wall by way of an adhesive pad.

4. The method according to claim 2, wherein the front-side wall is formed with a thickness of less than 0.5 mm.

5. The method according to claim 1,
wherein, on the front side, the sensor housing is formed with a front-side opening for the diaphragm,
wherein, during the placing of the diaphragm into the installed position, the diaphragm is passed through the front-side opening proceeding from the interior space of the sensor housing, and in the installed position, said diaphragm is brought into contact with an abutment element.

6. The method according to claim 5,
wherein the diaphragm is of pot-shaped form with a radially outwardly protruding collar,
wherein, during the placing of the diaphragm into the installed position through the front-side opening, the collar is brought into contact with the abutment element.

7. The method according to claim 5,
wherein the diaphragm is brought into contact with a vibration decoupling element, which is formed from a soft elastic material, as abutment element, said element being attached to a flange element, which delimits the front-side opening, of the sensor housing.

8. The method according to claim 1, further comprising:
inserting a fastening element is inserted through the rear-side installation opening into the interior space of the sensor housing, by way of which fastening element the diaphragm is held in the installed position so as to be secured in position along the emitting direction.

9. The method according to claim 8, further comprising a damping element formed from a soft elastic material is arranged between the diaphragm and the fastening element.

10. The method according to claim 1,
wherein, after the placing of the diaphragm into the installed position, an intermediate space between the diaphragm and the sensor housing and/or an interior space of the diaphragm is filled with a single-component sealing compound.

11. An ultrasound sensor formed by installation steps from a single side of the ultrasound sensor, comprising:
a diaphragm for emitting ultrasound signals in an emitting direction; and
a sensor housing, in and/or on which the diaphragm is fastened,
wherein by way of the sensor housing, the ultrasound sensor is configured to be installed on a holder which is connected to a panelling part of a motor vehicle,
wherein the sensor housing has a front side, which points in the emitting direction of the diaphragm, and a rear side, which points in a rearward direction which is opposite to the emitting direction,
wherein, on the rear side, the sensor housing has an electrical contact element and a rear-side installation opening, wherein the diaphragm is inserted into the sensor housing through the rear-side installation opening in the emitting direction, and is fastened, in an installed position, to the front side of the sensor housing, and
wherein, subsequent to the diaphragm being inserted into the sensor house through the rear-side installation opening, at least one electrical contact element is placed into the sensor housing for transmitting the ultrasound signals to the electrical contact element of the sensor housing,
wherein placing said at least one electrical contact element into the sensor housing subsequent to the diaphragm being into the sensor housing through the rear-side installation opening eliminates performing any installation step from the front side of the sensor housing.

12. The ultrasound sensor according to claim 11,
wherein, on the front side, the sensor housing has a front-side wall which delimits an interior space of the sensor housing, and, a front side, which points in the emitting direction, of the diaphragm is connected to an inner side, which faces toward the interior space of the sensor housing, of the front-side wall.

13. The ultrasound sensor according to claim 11, wherein, on the front side of the sensor housing, there is formed a front-side opening through which the diaphragm extends.

14. A motor vehicle having an ultrasound sensor according to claim 11.

* * * * *